(12) United States Patent
Cook et al.

(10) Patent No.: US 10,131,092 B1
(45) Date of Patent: Nov. 20, 2018

(54) MATERIAL JOINT FOR AN INFLATABLE STRUCTURE AND METHOD OF CONSTRUCTING THE SAME

(71) Applicants: Kevin D. Cook, Orlando, FL (US); Brian Hayes, Orlando, FL (US); Xue Shuang Liu, Nansha District (CN)

(72) Inventors: Kevin D. Cook, Orlando, FL (US); Brian Hayes, Orlando, FL (US); Xue Shuang Liu, Nansha District (CN)

(73) Assignee: KIB Corporation, St. Cloud, FL (US)

( * ) Notice: Subject to any disclaimer, the term of this patent is extended or adjusted under 35 U.S.C. 154(b) by 0 days.

(21) Appl. No.: 15/783,648

(22) Filed: Oct. 13, 2017

(51) Int. Cl.
| | | |
|---|---|---|
| *A63G 31/12* | (2006.01) | |
| *B29C 65/00* | (2006.01) | |
| *E04B 1/41* | (2006.01) | |
| *B29C 65/62* | (2006.01) | |
| *A63G 21/02* | (2006.01) | |
| *B29L 22/02* | (2006.01) | |
| *B29C 65/04* | (2006.01) | |
| *B29C 65/10* | (2006.01) | |

(52) U.S. Cl.
CPC ............ *B29C 66/439* (2013.01); *A63G 21/02* (2013.01); *A63G 31/12* (2013.01); *B29C 65/62* (2013.01); *B29C 66/1122* (2013.01); *B29C 66/131* (2013.01); *B29C 66/135* (2013.01); *B29C 66/723* (2013.01); *E04B 1/40* (2013.01); *B29C 65/04* (2013.01); *B29C 65/10* (2013.01); *B29L 2022/02* (2013.01)

(58) Field of Classification Search
CPC .............. A63G 31/12; Y10T 29/49826; Y10T 29/49947; Y10T 156/00; Y10T 156/10; Y10T 403/472; B29C 65/4835; B29C 66/00; B29C 66/71; B29C 66/116; F16B 11/00
USPC ................ 472/117, 128, 134; 446/220–226; 403/265
See application file for complete search history.

(56) References Cited

U.S. PATENT DOCUMENTS

| | | | | |
|---|---|---|---|---|
| 6,659,837 B1 * | 12/2003 | Lieberman | ........... | A63H 17/262 446/220 |
| 7,104,864 B1 * | 9/2006 | Liou | ...................... | A63H 33/10 446/221 |

(Continued)

*Primary Examiner* — Kien Nguyen
(74) *Attorney, Agent, or Firm* — R. Tracy Crump

(57) ABSTRACT

A material joint connecting an internal spar or baffle to panel walls of inflatable structures. The material joint is formed by a folded center strip and a pair of side strips. The side edges of the center strip are folded to form an initial "T-shaped" cross-section having a middle section, two side sections formed by a first bend, and two overlapping end sections formed by a second bend. The middle section is fused directly to the facing surface of the panel wall and the overlapping end sections are fused together to extend perpendicularly from the middle section. The end strips overlap the center strip with part of the end strips fused to the side sections of the center strip and part fused directly to the panel wall. The spar or baffle is connected to the fused overlapping end sections of the center strip. Under the internal air pressure of the inflated structure, the side sections bow and arc under tension from the connected spar or baffle and the middle section acts as a "bridge" to lift and flatten the exterior surface of the panel wall across its width.

5 Claims, 9 Drawing Sheets

(56) References Cited

U.S. PATENT DOCUMENTS

| | | | |
|---|---|---|---|
| 7,244,487 B2 * | 7/2007 | Brantley | B29C 65/561 |
| | | | 244/123.7 |
| 2007/0123141 A1 * | 5/2007 | Berkey | A47D 3/005 |
| | | | 446/220 |
| 2014/0341641 A1 * | 11/2014 | Stawski | B32B 37/1009 |
| | | | 403/265 |

* cited by examiner

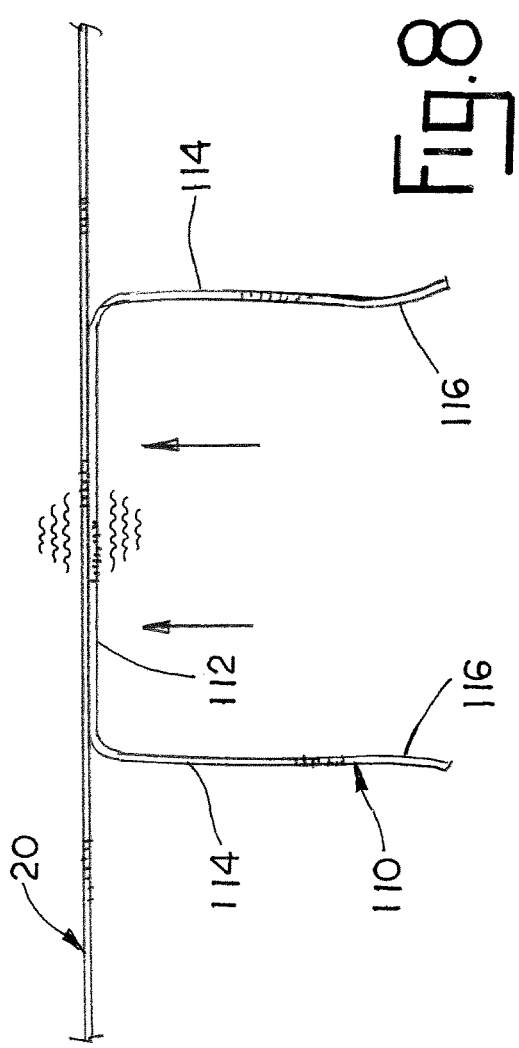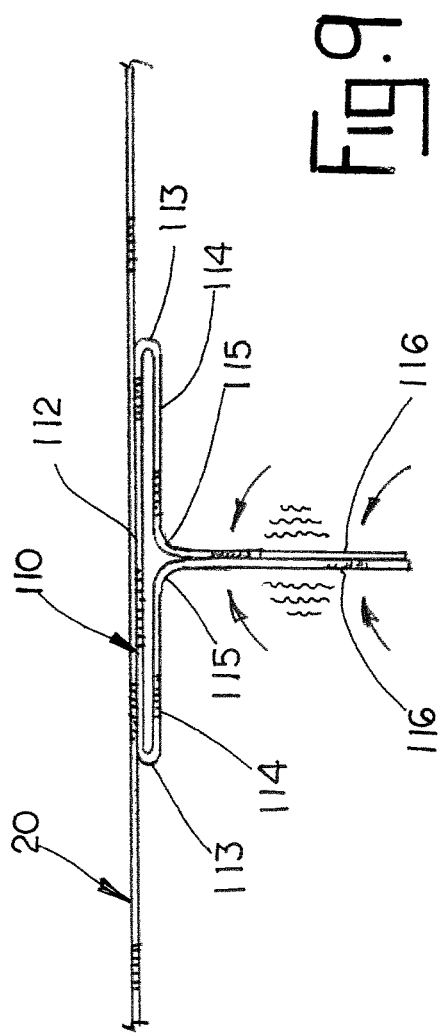

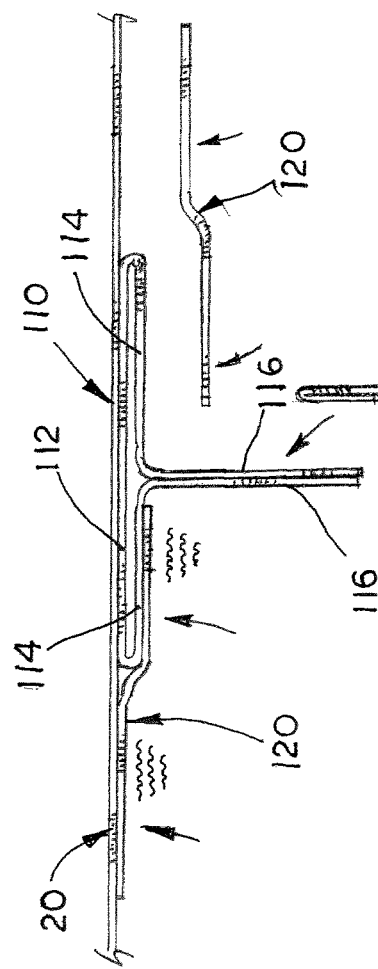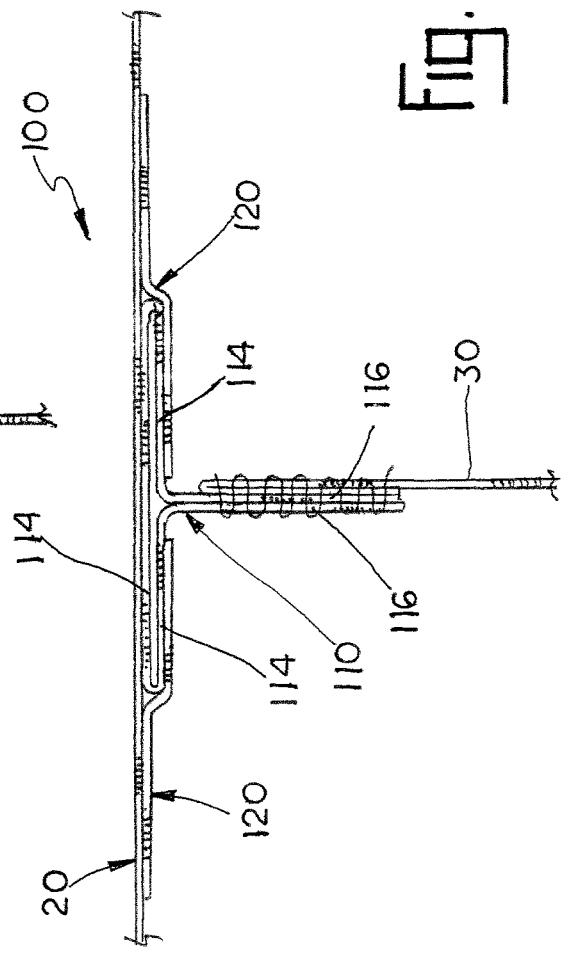

MATERIAL JOINT FOR AN INFLATABLE STRUCTURE AND METHOD OF CONSTRUCTING THE SAME

This invention relates to a material joint used in inflatable structures, such as inflatable fun houses and slides, and the method of constructing the same.

BACKGROUND OF THE INVENTION

Inflatable structures are constructed from sheets and strips of thermoplastic covered fabrics sewn and fused together to form the walls and sections of the structure, which are then inflated by fans and blowers. The cavity between the layers of fabric is pressurized with air to produce a rigid structural element. Sewn joints and seams of all inflatable structures leak or "bleed" air. High-volume fans or blowers replace the air that is bled through the sewn seams.

Inflatable structures use internal spars and baffles of the thermoplastic fabric used to provide additional structural integrity. Typically, spars and baffles extend between two main wall panels of the structure and are sewn or heat fused to those panels. Heretofore, internal spars and baffles are joined between two wall panels using what is commonly referred to as a "T-Weld." FIGS. 1 and 2 illustrate a conventional T-weld. As shown, a T-weld consists of strips of PVC fabric that extends the length of the spar or baffle and is heat welded to the wall panel. These strips are folded into an "L" shape and positioned opposed to one another—back to back. The adjacent backs of the strips are heat welded together forming the "T" shape element with the extending legs, which are heat welded directly to the wall panel. The internal spar or baffle is sewn or welded directly to either side of the fused backs of the two strips.

While useful in most applications, the use of T-welds produces a "pillowed" surface in the main wall panels. While the T-weld securely connects the spar or baffle to the main wall panel, the L-shaped strips that form the T-weld do not prevent the main wall panel from bowing outward when the structure is inflated, as shown in FIG. 2. As a result the wall panel generates an undulating external surface. In many applications, such as for slide lanes of an inflatable slide, a more flat and "seamless" external surface is desirable.

SUMMARY OF INVENTION

The present invention provides a material joint for connecting internal spars and baffles to panel walls of inflatable structures. The material joint of this invention or "triangle weld" reduces the "pillowing" of the panel walls generally associated with the use of conventional T-weld material joints and creates a flatter exterior wall surface. The triangle weld also more evenly distributes the material stress on the panel walls, and internal spars and baffles.

The triangle weld is formed by a folded center strip and a pair of side strips that are fused or "welded" together or directly to the panel walls. The side edges of the center strip are folded to form an initial "T-shaped" cross-section having a middle section, two side sections formed by a first bend, and two overlapping end sections formed by a second bend. The middle section is fused directly to the facing surface of the panel wall and the overlapping end sections are fused together to extend perpendicularly from the middle section. The end strips overlap the center strip with part of the end strips fused to the side sections of the center strip and part fused directly to the panel wall. The spar or baffle is connected to the fused overlapping end sections of the center strip.

The center strip has a generally "T-shaped" cross section when the structure is not inflated, but takes on a "triangular" cross-section when the structure is inflated. When inflated, the internal air pressure within the structure expands the center strip and spaces the side sections away from the middle section. Under the internal air pressure of the inflated structure, the side sections bow and arc under tension from the connected spar or baffle and the middle section acts as a "bridge" to lift and flatten the exterior surface of the panel wall across its width.

The above described features and advantages, as well as others, will become more readily apparent to those of ordinary skill in the art by reference to the following detailed description and accompanying drawings.

BRIEF DESCRIPTION OF THE DRAWINGS

The present invention may take form in various system and method components and arrangement of system and method components. The drawings are only for purposes of illustrating exemplary embodiments and are not to be construed as limiting the invention. The drawings illustrate the present invention, in which:

FIG. 8 is a cross-sectional view of the middle of the center strip used in the material joint of FIG. 4 being fused to a top panel of the inflatable structure;

FIG. 9 is a cross-sectional view of the ends of the center strip of the material joint of FIG. 4 being fused together;

FIG. 10 is a cross-sectional view of the side strips being fused to the center strip and the top panel of the inflatable structure; and FIG. 11 is a cross-sectional view of a spar sewn to the fused ends of the center strip.

DESCRIPTION OF THE PREFERRED EMBODIMENT

In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical, structural and mechanical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
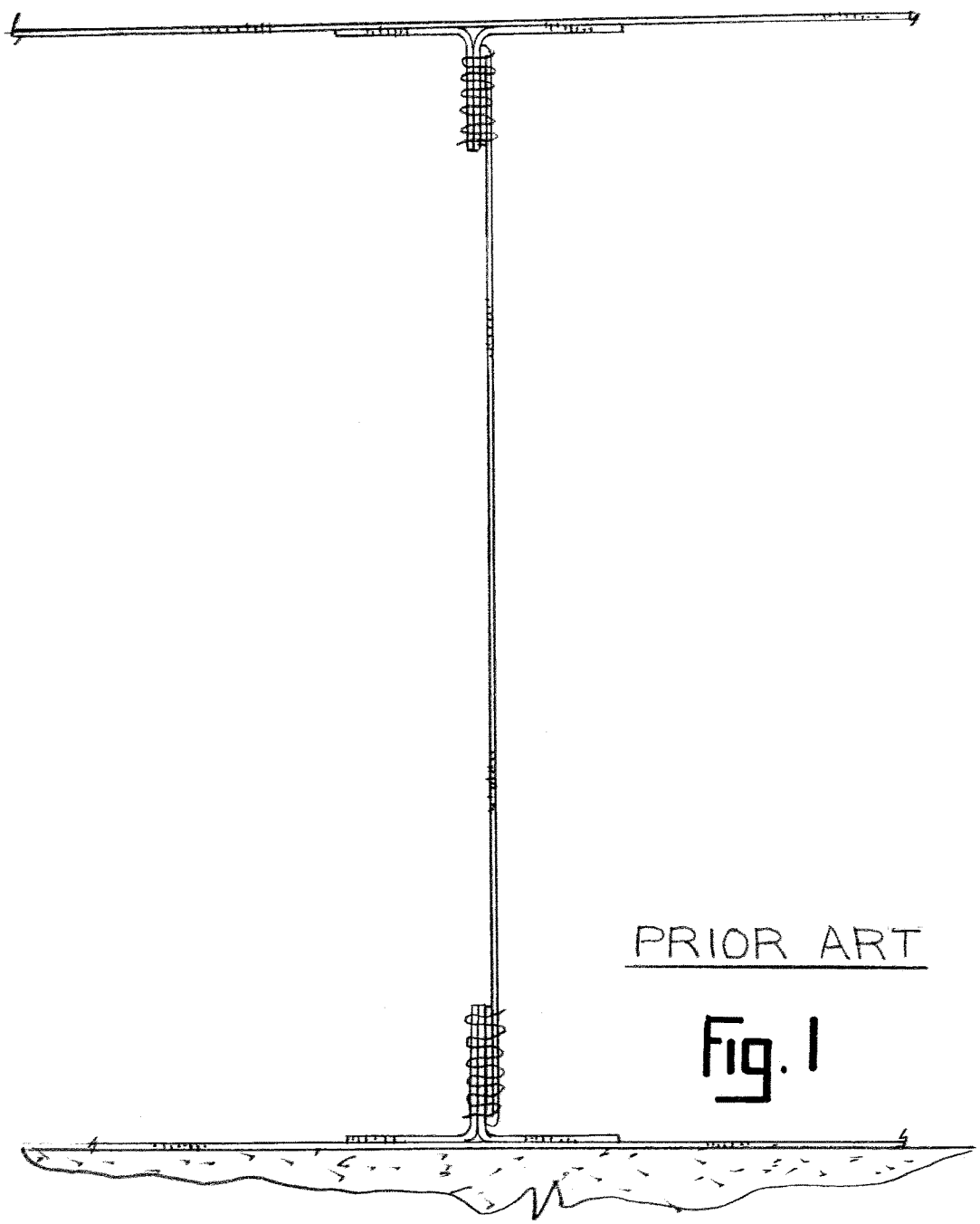
FIG. 1 is a perspective view of an exemplary inflatable structure using the material joint of this invention.
Figure 2:
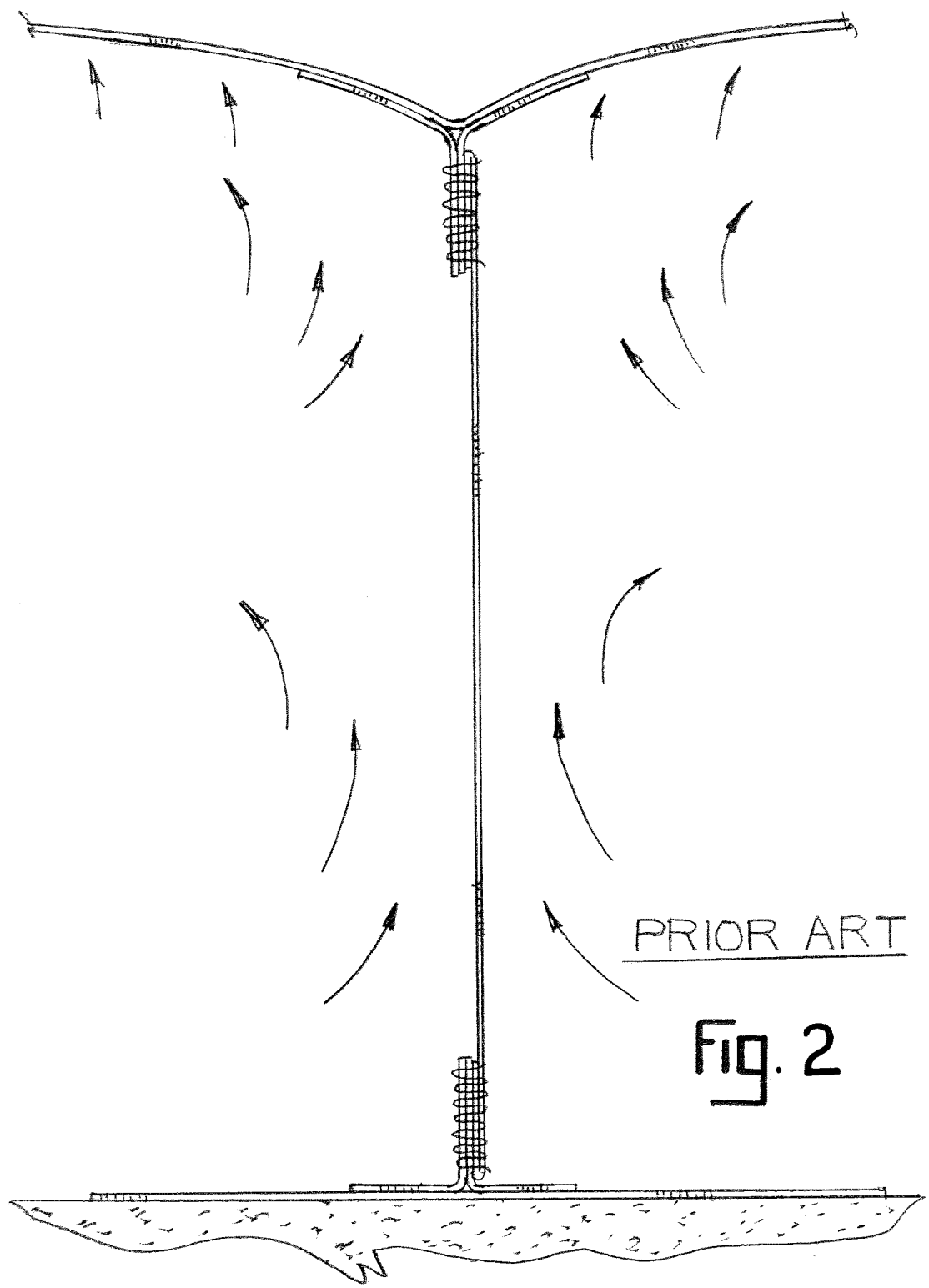
FIG. 2 is a cross-sectional view of the T-weld material joint representing the prior art.

Referring now to the drawings, FIGS. 1 and 2 illustrate a conventional T-weld used in an exemplary inflatable structure, which constitutes the state of the prior art. FIGS. 4-7, illustrates an exemplary embodiment of the material joint or "triangle weld" of this invention, which is designated generally as reference numeral 100. Triangle weld 100 of this invention is used primarily to secure internal spars and baffles to exterior panel walls of the given structure. Triangle weld 100 is used to produce a flatter exterior surface to inflatable panel walls. Triangle weld 100 reduces the "pillowing" of external panel walls generally associated with the use of conventional T-weld material joints, and more evenly distributes the material stress on the panel walls, and internal spars and baffles.

Figure 3:
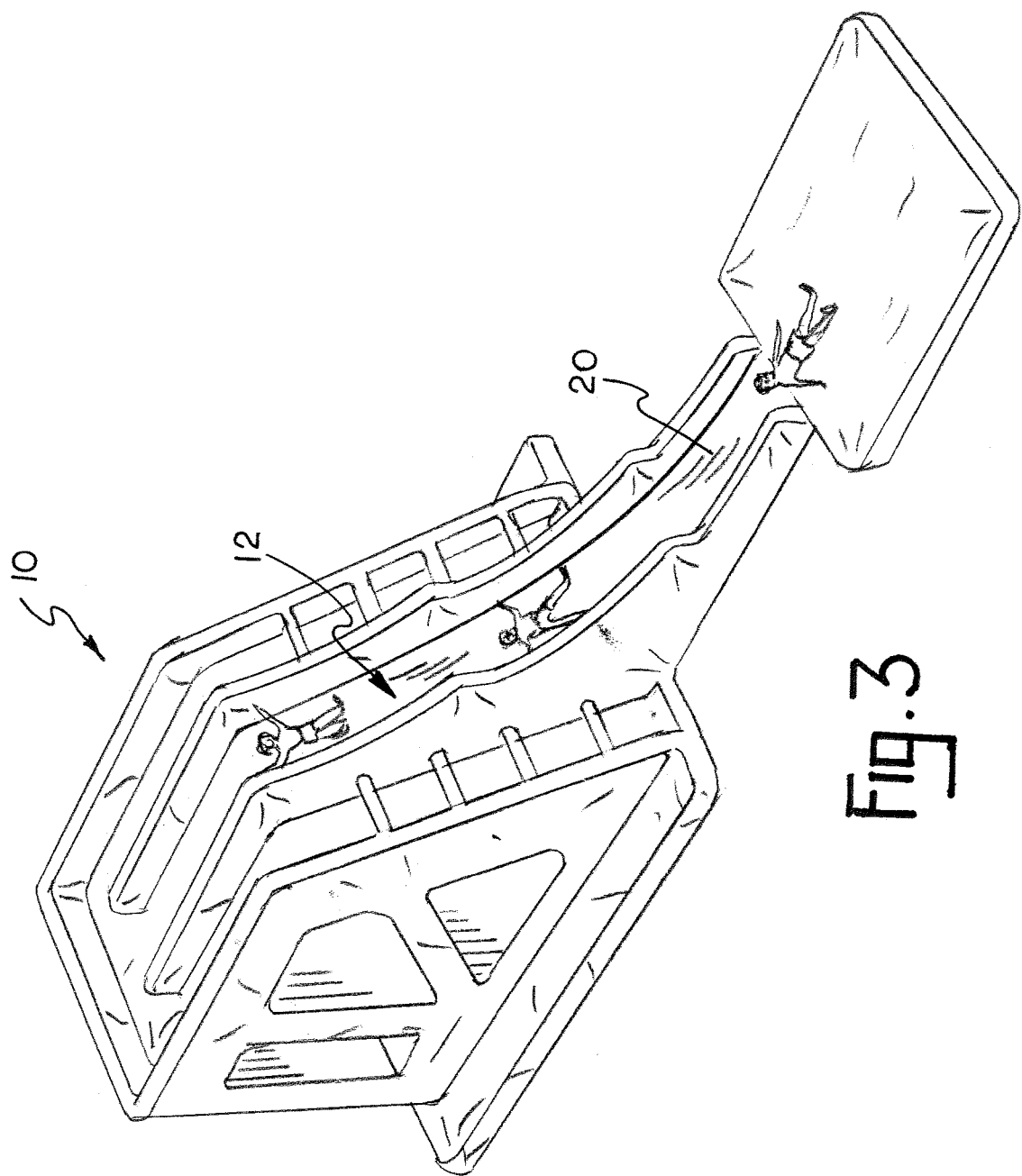
FIG. 3 is a cross-sectional view of the T-weld of FIG. 2 shown inflated.
Figure 4:
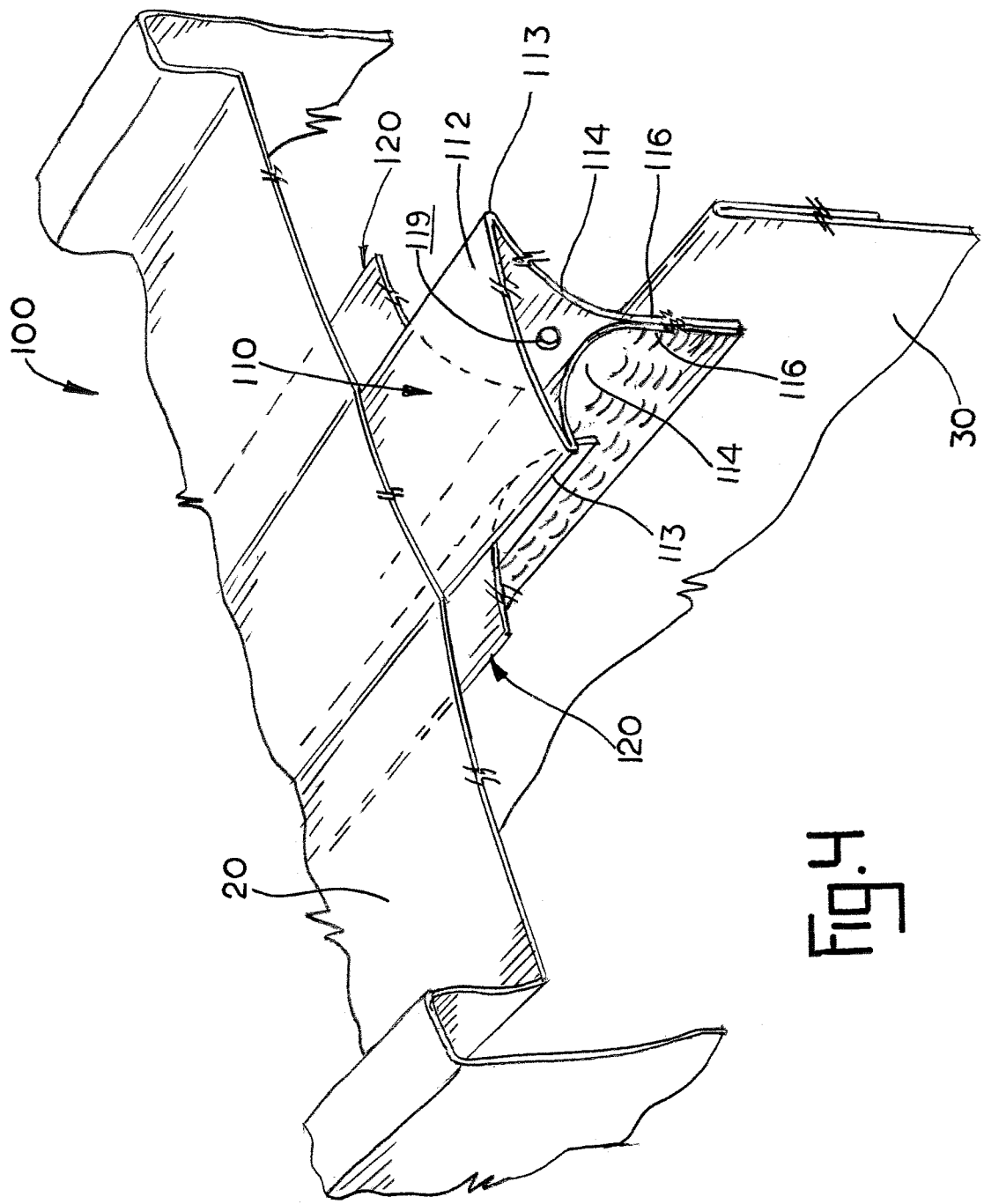
FIG. 4 is a perspective view of an exemplary embodiment of the material joint of this invention with portions cut away as used in the inflatable structure of FIG. 1.

FIG. 3 illustrates an exemplary inflatable slide 10 that incorporates triangle weld 100 as part of the internal construction of the smooth, flat central slide lane 12. While illustrated as part of inflatable slide 10, the triangle weld of this invention and its construction process and methods may be incorporated into the design and construction of any inflatable structure. Slide lane 12 includes a top panel wall 20 and a spar panel 30 joined by triangle weld 100. Panel wall 20 and spar 30 are constructed of sheets of thermoplastic covered fabrics, of the type typically used in inflatable structures, such as a "PVC" coated woven nylon cloth. Generally, panel wall 20 is of a thicker gauge fabric than spar 30.

Triangle weld 100 is a material joint formed by three strips of thermoplastic covered fabric: a folded longitudinal center strip 110 and two side longitudinal strips 120. Strips 110 and 120 are of a similar material as panel wall 20 and spar 30 and of sufficient gauge as to facilitate the joinder of panel wall 20 and spar 30. The various sections of center strip 110 and side strips 120 are fused or "welded" together or directly to panel wall 20 using either radio frequency ("RF") or hot air fusing processes and technology. RF and hot air fusing process and technology are well know in the art and both use heat and pressure to fuse the thermoplastic coatings of adjacent sheets together. As shown, spar 30 is sewn to center strip 110, but may in alternative embodiments be fused together.

Figure 5:
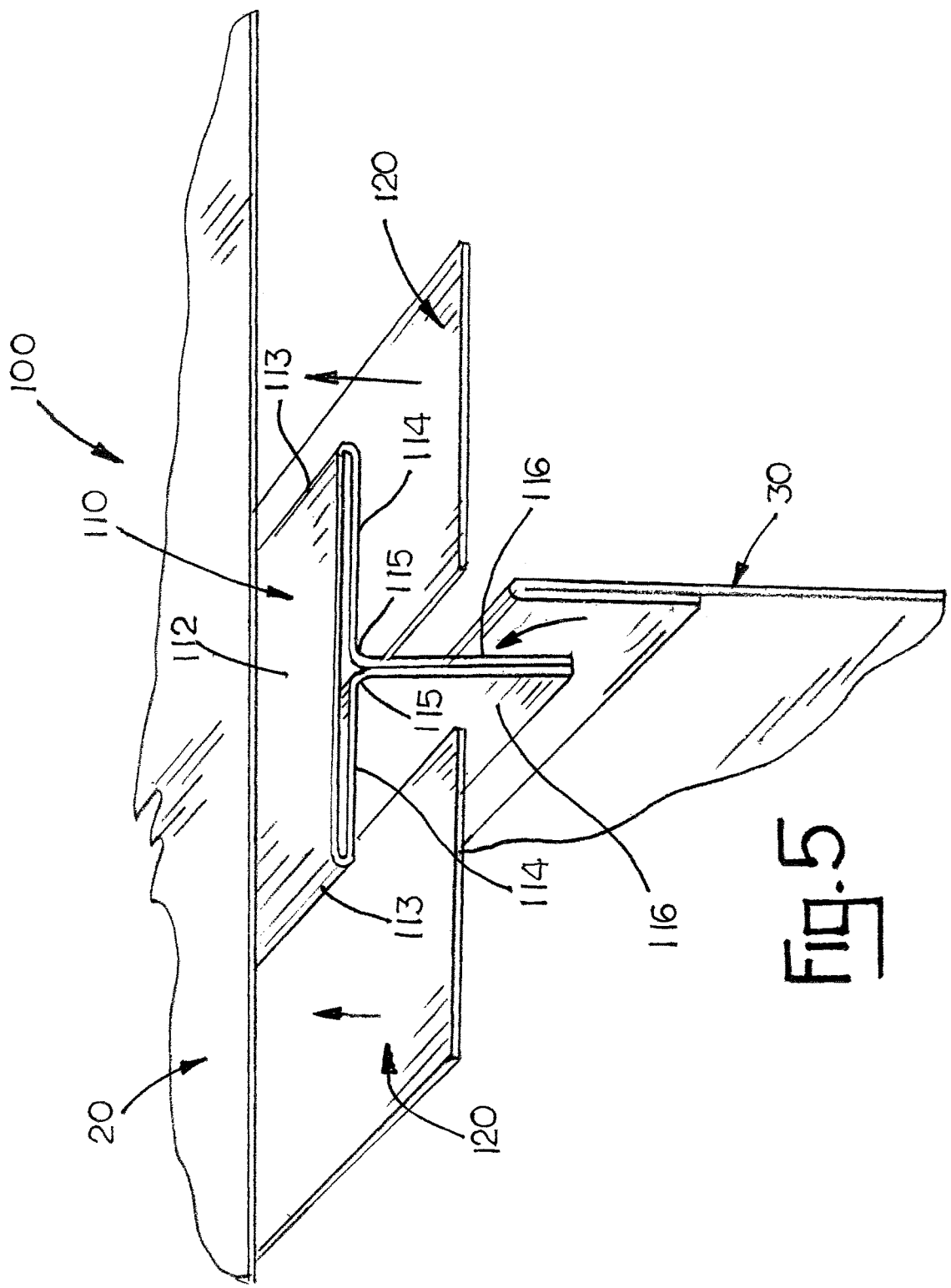
FIG. 5 is an exploded cut-away view of the material joint of FIG. 5.
Figure 6:
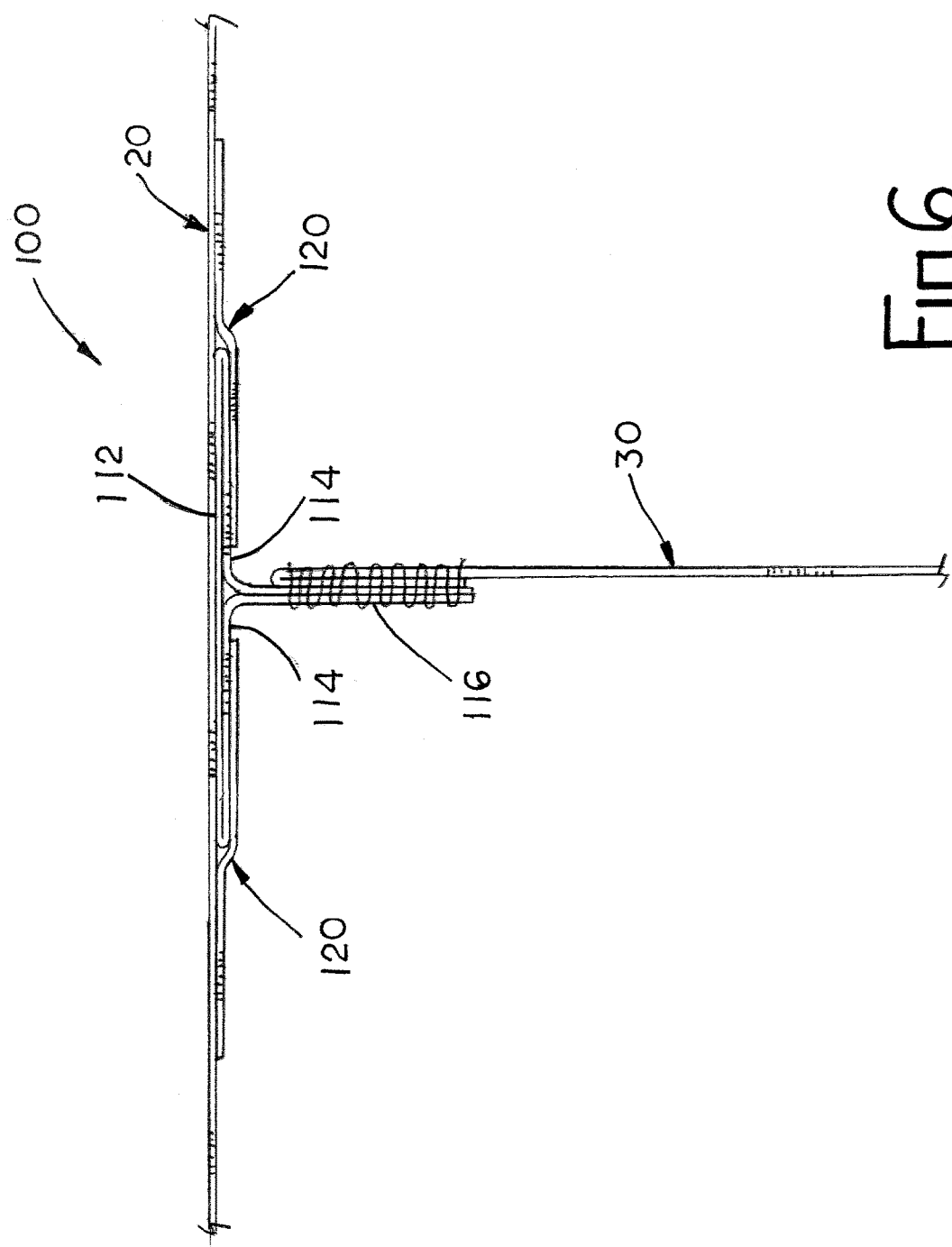
FIG. 6 is a cross-sectional view of the material joint of FIG. 4.

As best shown in FIGS. 5 and 6, the edges of center strip 110 are folded to form an initial "T-shaped" cross-section having a middle section 112, two side sections 114 formed by a first bend 113 and two overlapping end sections 116 formed by a second bend 115. Side sections 114 have a plurality of openings 119 therethrough across the length of center strip 110. Middle section 112 is fused directly to the facing surface of panel wall 20. The overlapping end sections 116 are fused together to extend perpendicularly from middle section 112. End strips 120 overlap center strip 110 with part of the strips fused to side section 114 of center strip 110 and part fused directly to panel wall 20. As shown, substantially the entire width of middle section 112 contacts and is fused to the facing surface of panel wall 20. In addition, side strips 120 overlap and are fused to substantially the entire width of the facing surface of side section 114.

Figure 7:
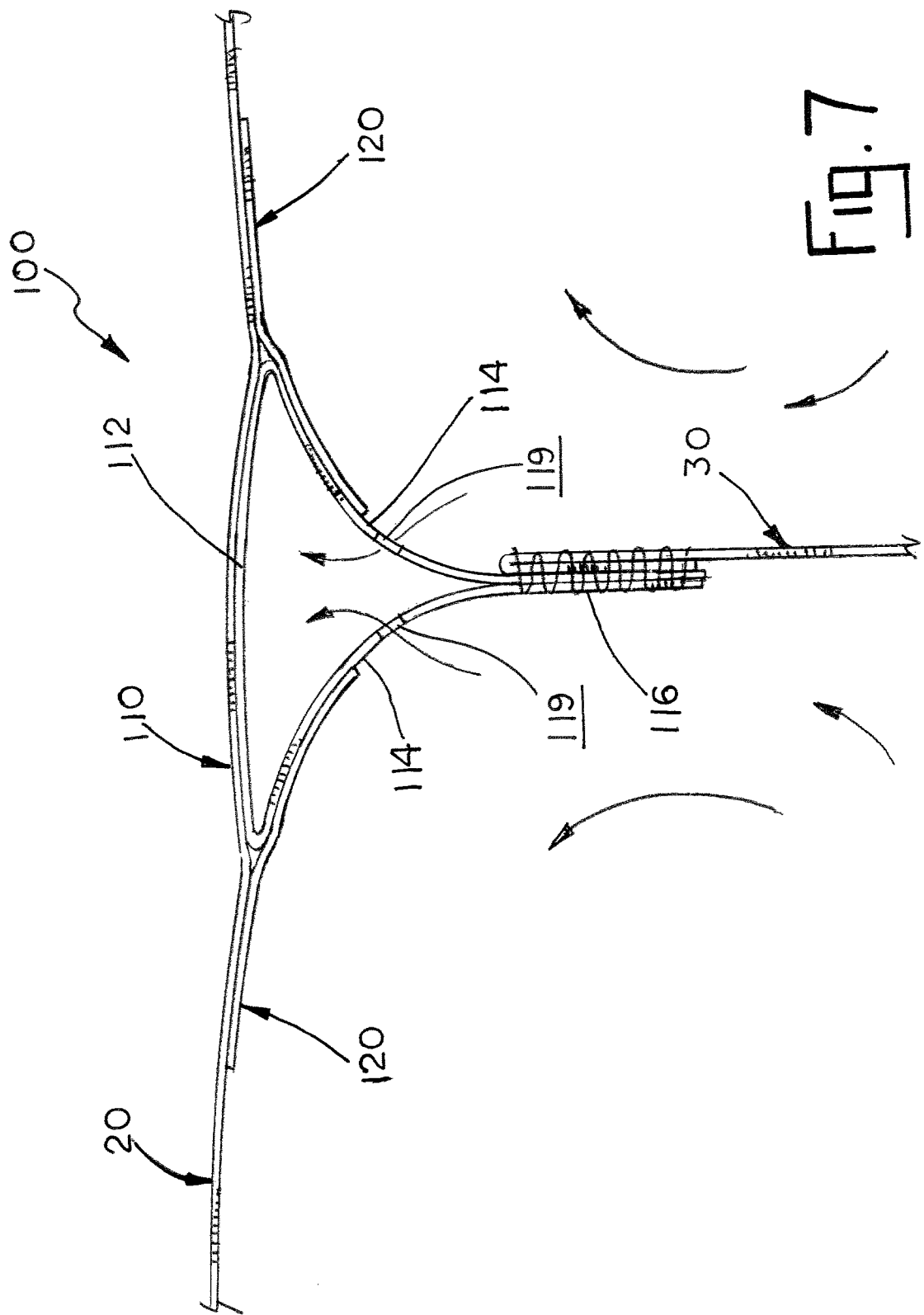
FIG. 7 is a cross-sectional view of the material joint of FIG. 4 shown with the structure inflated.

In use, center strip 110 has a generally T-shaped cross section when the structure is not inflated (FIG. 6), but takes a "triangular cross-section when the structure is inflated (FIG. 7). When inflated, the internal air pressure within the structure expands center strip 110 and spaces side sections 114 away from middle section 112. Air enters into the cavity formed in folded center strip 110 by the side sections 114 and middle section 112 through openings 119. Under the internal air pressure, side sections 114 bow and arc under tension from spar 30, and middle section 112 extends to act as a "bridge" to lift and flatten wall panel 20 across its width. In addition, the triangular configuration of the folded center strip 110 also helps to more evenly distribute the lateral loads from panel wall 20 and spar 30 flattening panel wall 20 across its width. Side strips 120 provide more surface area to the material joint and help transfer the load between panel wall 20 and spar 30.

FIGS. 8-11 illustrate the progressive steps for constructing triangle weld 100 in an exemplary inflatable structure, such as slide 10. First, the length of middle section 112 is heat fused to the facing surface of panel wall 20 (FIG. 8). Once middle section 112 is attached, the edges of center strip 110 are gathered and end sections 116 are heat fused together (FIG. 9). Next, side strips 120 are laid over side sections 114 on either side of end sections 116 and heat fused to side sections 114 and panel wall 20 (FIG. 10). With side strips 120 fused in place to panel wall 20 and center strip 110, the fused end sections 116 extend perpendicularly from the panel wall 20 providing the structural element for securing spar 30 to center strip 110. Lastly, the folded edge of spar 30 is connected to the fused end sections 116 of center strip 110 (FIG. 11). Generally, the folded edge of spar 30 is sewn directly to one side of the fused end sections, but in alternative embodiments may be heat fused.

It should be apparent from the foregoing that an invention having significant advantages has been provided. While the invention is shown in only a few of its forms, it is not just limited but is susceptible to various changes and modifications without departing from the spirit thereof. The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

We claim:

1. In an inflatable structure, a material joint connecting a first panel of thermoplastic covered fabric to a second panel of thermoplastic covered fabric, the joint comprising:
   a first strip of thermoplastic covered fabric connected between the first panel and the second panel; and a second strip of thermoplastic covered fabric connected to the first strip and the first panel,
   the first strip being folded to have a middle section thereof, two opposed side sections thereof formed by a first bend in the first strip and two overlapping end sections thereof formed by a second bend in the first strip, the middle section of the first strip fused directly to the first panel, the two overlapping end sections fused together to extend perpendicularly from the middle section, the second strip partially overlapping the first strip with a portion thereof fused to one of the two side sections and another portion fused directly to the first panel, the second panel connected to the two overlapping end sections.

2. The material joint of claim 1 wherein each of the side sections have a plurality of openings there through.

3. The material joint of claim 1 and a third strip partially overlapping the first strip with a portion thereof fused to the other of the two side sections and another portion fused directly to the first panel.

4. A method of joining a first panel of thermoplastic covered fabric to a second panel of thermoplastic covered fabric in an inflatable structure, the method comprising the following steps:
   a) providing a first foldable strip having a middle section and side ends thereof;
   b) fusing the middle section of the first strip to the first panel;
   c) folding the first strip so that the side ends thereof overlap;
   d) fusing the side ends of the first strip together so that the fused side ends extend outward from the middle section;
   e) providing a second strip;
   f) fusing the second strip to the first panel and the first strip so that a portion of the second strip partially overlies a first portion of the middle section of the first strip adjacent the fused side ends of the first strip; and
   g) connecting the second panel to the fused ends of the first strip.

5. The Method of claim 4 and the additional steps of,
   h) providing a third strip, and
   i) fusing the third strip to the first panel and the first strip so that a portion of the second strip partially overlies a second portion of the middle section of the first strip adjacent the fused side ends of the first strip.

\* \* \* \* \*